(12) United States Patent
Kanjo et al.

(10) Patent No.: US 6,761,253 B1
(45) Date of Patent: Jul. 13, 2004

(54) SPRING APPLIED PARKING BRAKE ASSEMBLY

(75) Inventors: Wajih Kanjo, Lockport, IL (US); Scott Natschke, Kankakee, IL (US)

(73) Assignee: Westinghouse Air Brake Company, Wilmerding, PA (US)

( * ) Notice: Subject to any disclaimer, the term of this patent is extended or adjusted under 35 U.S.C. 154(b) by 120 days.

(21) Appl. No.: 09/512,164

(22) Filed: Feb. 24, 2000

(51) Int. Cl.⁷ ............................................. B60T 13/04
(52) U.S. Cl. ..................................... 188/167; 188/170
(58) Field of Search ................................ 188/170, 166, 188/167

(56) References Cited

U.S. PATENT DOCUMENTS

| | | | | |
|---|---|---|---|---|
| 3,799,297 A | * | 3/1974 | Ruburn et al. | 188/170 |
| 3,842,950 A | * | 10/1974 | Fontaine | 188/170 |
| 4,116,113 A | * | 9/1978 | Leclerc | 188/170 |
| 5,154,491 A | * | 10/1992 | Graham | 188/170 |
| 5,353,688 A | * | 10/1994 | Pierce et al. | 188/170 |
| 5,399,002 A | * | 3/1995 | Taylor | 188/353 |
| 5,630,354 A | * | 5/1997 | Hofner et al. | 188/366 |

* cited by examiner

*Primary Examiner*—Jack Lavinder
*Assistant Examiner*—Devon Kramer
(74) *Attorney, Agent, or Firm*—James Ray & Associates

(57) ABSTRACT

A spring applied parking brake assembly for a railway vehicle is provided which automatically activates upon removal of a railway car from the pneumatic braking system of the railway vehicle. The spring applied parking brake assembly comprises a casing which is mounted on or within the braking system, typically alongside the air cylinder. This casing contains a spring member and a piston assembly, both of which are mounted for longitudinal movement within the casing upon the application and/or removal of pneumatic pressure within the casing. The piston assembly includes a piston rod which is associated with the force transfer lever of the braking system such that upon a removal of pneumatic pressure within the casing, longitudinal movement of the piston rod causes this force transfer lever to rotate and apply a force to at least one force transmitting member in the vehicle braking system to initiate a brake application. An arrangement or system for installing the spring applied parking brake assembly within a railway vehicle braking system is also provided.

15 Claims, 4 Drawing Sheets

SPRING APPLIED PARKING BRAKE ASSEMBLY

FIELD OF THE INVENTION

The present invention relates, in general, to a parking brake assembly for use in a railway vehicle braking system and, more particularly, this invention relates to a spring applied parking brake assembly for use in a railway vehicle braking system which is activated by the absence of air in the railway vehicle braking system and, still more specifically, the present invention relates to a spring applied parking brake assembly for use in a railway vehicle truck mounted brake assembly.

BACKGROUND OF THE INVENTION

As is generally well known in the railway industry, when railway cars are taken out of a train and parked at a siding, or yard, the hand brake or parking brake on at least some of these cars is applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car.

As illustrated in FIG. 3, in truck mounted braking systems, the hand brake mechanism is normally either a cast or stamped metal gear housing usually attached to an outside end wall of the railway car. Such hand brake mechanism has a rotatable chain drum therein which can be rotated by turning the hand wheel to wind a brake chain onto the chain drum.

The other end of the brake chain normally extends through the bottom of the gear housing and is interconnected with a cable, or other linkage such as a hand brake lever, to the brake beam which carries the brake shoes such that winding of the brake chain onto the chain drum will apply tension to the brake chain and linkage as necessary to draw the interconnected brake shoes against the tread surfaces of adjacent railway car wheels and, accordingly, apply the hand brake as intended.

A disadvantage of this prior art type hand brake arrangement is that an operator must be certain that the handwheel is turned at least a sufficient amount to ensure that the parking brake is engaged. Also, the possibility exists that the operator may forget to apply the brake altogether, which could result in unexpected movement of the railway car while parked at the siding or yard. Furthermore, operation of the handwheel requires exerting a considerable amount of physical force from an awkward position. This, in turn, makes the hand brake difficult to apply.

SUMMARY OF THE INVENTION

Briefly, the invention comprises a casing which is mounted on or within the braking system, typically alongside the air cylinder. This casing contains a spring member and a piston assembly, both of which are mounted for longitudinal movement within the casing. One end of the spring member contacts or is capable of pushing against an inside surface of the casing. The opposite end of the spring member is associated with the piston assembly such that the piston assembly moves in accordance with movement of the spring member. The piston assembly includes a piston rod associated therewith which also moves in accordance with movement of the spring member. The piston rod is attached to or is associated with the force transfer lever of the braking system such that longitudinal movement of the piston rod causes this force transfer lever to rotate and apply a force to at least one force transmitting member in the vehicle braking system to initiate a brake application.

Air pressure from the pneumatic braking system causes the spring to remain in compressed condition while the railway car is in position within the train consist. Upon removal of this railway car from the train and consequently from the pneumatic braking system, the spring automatically extends to its natural position so as to initiate the braking sequence.

The invention also includes an arrangement or system for installing the spring applied parking brake assembly within a railway vehicle braking system. This arrangement comprises a tubular member mounted for longitudinal movement within the casing. The tubular member is also associated with the piston assembly and the spring member and moves in accordance with movement of the piston assembly and the spring member. The casing includes an opening at one end and the tubular member can extend through this opening when the piston assembly and spring member are moved in a direction so as to compress the spring member. A holding means is provided for holding the portion of the tubular member which extends through the opening in place so that the spring member is held in the compressed position which causes the spring applied brake assembly to be in a deactivated position. Consequently, the spring applied parking brake assembly may be held in this deactivated position during installation within the railway vehicle braking system. Additionally, this holding means may be employed to hold the spring applied parking brake assembly in a deactivated position if for any reason one would desire that the parking brake on the car remain deactivated after removal of the car from the pneumatic braking system of the railway vehicle.

OBJECTS OF THE INVENTION

It is an object of the present invention to provide a spring applied parking brake assembly for a railway vehicle braking system which is an ergonomic alternative to the currently used manually activated hand brake assemblies.

Another object of the present invention is to provide a spring applied parking brake assembly which is particularly applicable to a truck mounted braking system.

Still another object of the present invention is to provide a spring applied parking brake assembly which may be used to replace the currently used manually activated handwheel hand brakes.

It is a further object of the present invention to provide a spring applied parking brake assembly for a railway vehicle braking system which is activated by the absence of air in the braking system ensuring that the parking brake is activated as soon as the car has been removed from the air brake system of the train.

Yet another object of the present invention to provide a spring applied parking brake assembly for a railway vehicle braking system which, if necessary, may be mechanically deactivated.

It is yet a further object of the present invention to provide a spring applied parking brake assembly for a railway vehicle braking system which by virtue of being automatically activated upon the removal of the car from the air brake system of the train will eliminate the possibility of operator error in applying the parking brake.

It is another object of the present invention to provide an arrangement or system for installing the spring applied parking brake assembly within a railway vehicle braking system.

Although a number of objects and advantages of the present invention have been described in some detail above, various additional objects and advantages of the spring applied parking brake assembly of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF THE INVENTION

Figure 1:
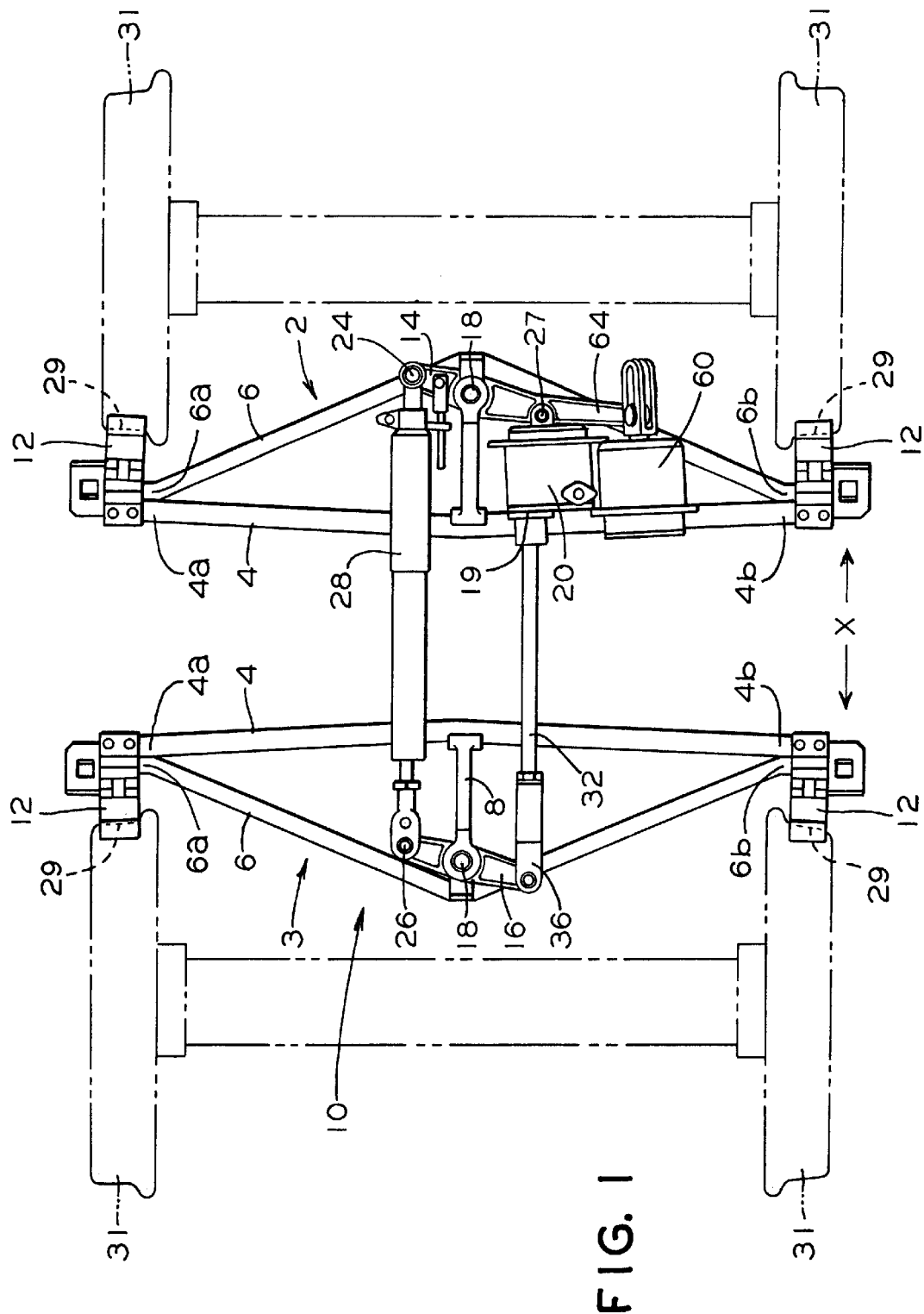
FIG. 1 is a plan view which shows a truck-mounted brake assembly including a spring applied parking brake assembly of the present invention.
Figure 2:
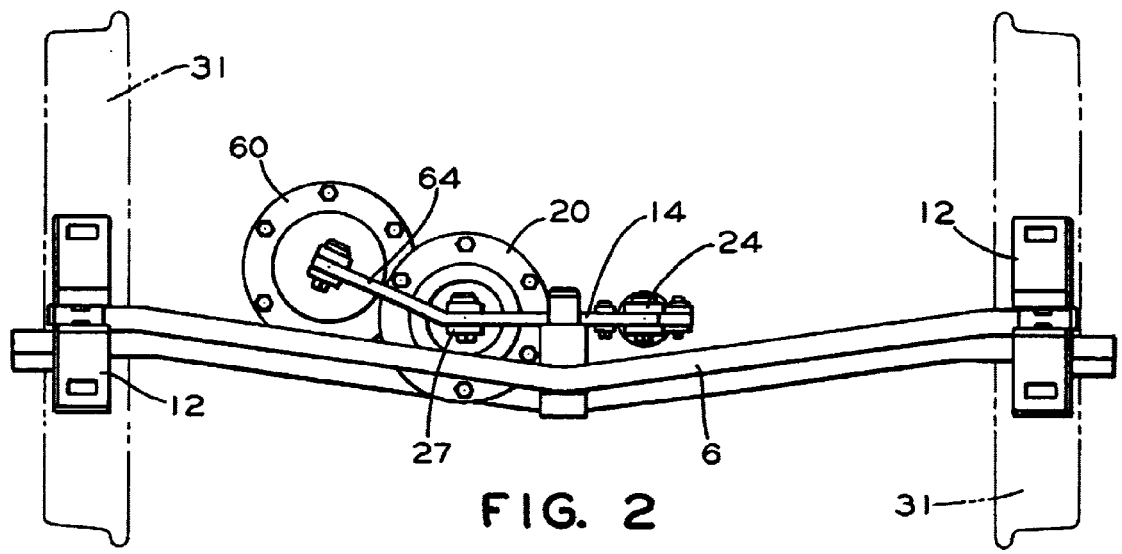
FIG. 2 is a front view of the truck-mounted brake assembly of FIG. 1 including the spring applied parking brake assembly.

Prior to proceeding with the more detailed description of the present invention, a description of a truck mounted braking system and its functioning should prove helpful in understanding the present invention. Also, it should be noted that for the sake of clarity, identical components which have identical functions have been identified with identical reference numerals throughout the several views illustrated in the attached drawing figures.

Referring now to FIG. 1, there is shown a truck-mounted brake assembly, generally designated 10, for a railway car (not shown). This brake assembly 10 comprises brake beams, generally designated 2 and 3, which are substantially identical, each such brake beam including a compression member 4, a tension member 6 and a strut member 8. The opposite ends of the compression member 4 and the tension member 6 may be permanently connected together, preferably by welding along an outer segment 4a–6a, 4b–6b at the opposite ends of the compression member 4 and the tension member 6.

At a location midway between their opposite ends, the compression member 4 and the tension member 6, of the respective brake beams 2 and 3, are spaced apart sufficiently to allow connection of the strut member 8 therebetween. Mounted on the respective outer end segments 4a–6a and 4b–6b of the brake beams 2 and 3 are brake heads 12.

A pair of force-transfer levers 14 and 16 are pivotally connected by pins 18 to the strut member (not shown) of the respective brake beams 2 and 3. Each end 24 and 26 of the respective force-transfer levers 14 and 16 is interconnected via the force-transmitting member 28, which may be in the form of an automatic slack adjuster device. The opposite end 36 of the force-transfer lever 16 is connected to the pressure head 19 of the brake cylinder assembly 20 via a force-transmitting member or a return push rod assembly 32.

When a brake application is made, pressurization of the brake cylinder assembly 20 results in actuation of the brake cylinder piston located in the brake cylinder assembly 20. This actuation of the piston causes a spring, also located in the brake cylinder assembly, to compress, resulting in movement of a push rod, which is attached to the force transfer lever 14, in a direction to effect counterclockwise rotation of the force-transfer lever 14. The force-transfer lever 14, in turn actuates the slack adjuster assembly 28 to effect counterclockwise rotation of the force-transfer lever 16 and consequent actuation of the return push rod assembly 32.

The force-transfer levers 14 and 16, along with the slack adjuster assembly 28, the return push rod assembly 32, and the brake cylinder assembly 20 comprise a brake beam actuating linkage that interconnects the brake beams 2 and 3 via pivot pins 18 and thus the required brake actuation forces effectively act along these pins 18. The resultant of these forces is shown at X. Since the length of the slack adjuster assembly 28 increases with actuation of the brake cylinder piston rod 37, it follows that brake beams 2 and 3 are moved apart by the brake beam linkage until the brake shoe engagement with the tread surface, as shown at 29, of the vehicle wheels 31 occurs.

During a parking situation when the railway cars are taken out of the train and parked at a siding or yard, the pneumatic braking system, as described above, can no longer be used. Thus, in order to apply the brake as a precaution against unwanted or unexpected movement of the cars, a hand brake mechanism, which is mounted on each car, can be employed.

Figure 3:
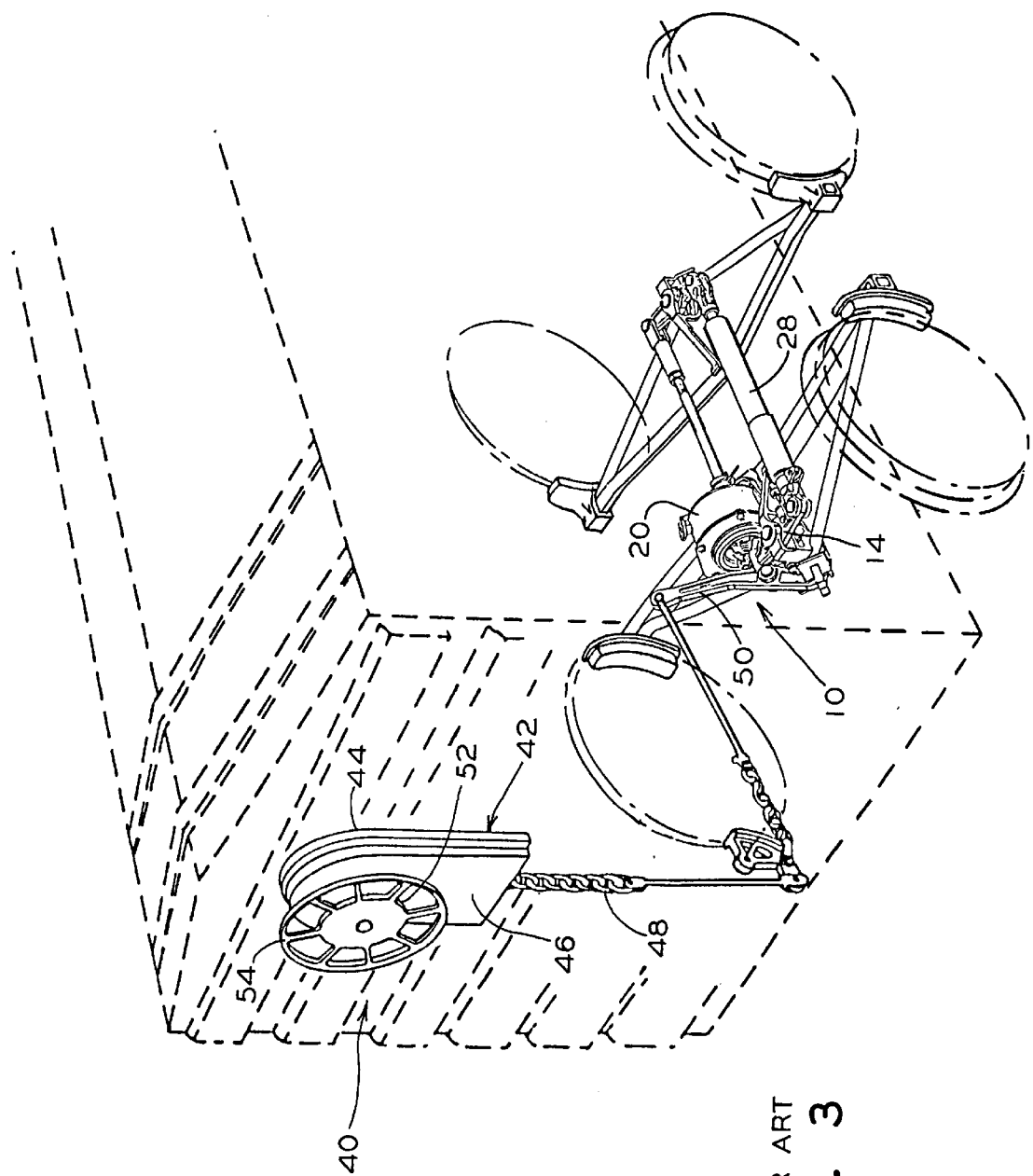
FIG. 3 is a plan view which shows a truck-mounted brake assembly having a conventional prior art handwheel hand brake or parking brake, as described above, and is accordingly labeled "Prior Art".

Referring to FIG. 3, a currently used handbrake mechanism, generally designated as 40, on a truck-mounted brake assembly is shown. The brake mechanism 40 has a housing, generally designated as 42, which comprises a back plate or wall 44, mountable on a railway car, and a cover 46. The cover 46 is secured to the back wall 44.

A chain 48, for application or release of the brakes, is connected, as is conventional, to the brake rigging via a hand brake lever 50, which chain 48 is attached to and wound on a winding drum 52. The hand brake lever 50 is, in turn, connected to an air cylinder transfer lever or force transfer lever 14.

In order to apply the brakes, a hand wheel 54 is rotated in a clockwise direction to wind the chain 48 about the winding drum 52 and to cause the hand brake lever 50 to be pulled in an outward direction away from the brake rigging 10. This causes the force transfer lever 14 to be rotated in a counterclockwise direction resulting in the piston push rod being pulled in an outward direction and the required force being applied to the slack adjuster assembly 28. This force is similar to the force which is applied by the brake cylinder piston, not shown, of the air cylinder assembly 20 when such is pressurized.

The present invention would replace this manually actuated hand wheel/chain/hand brake lever system with a spring applied/air released parking brake assembly. The spring applied/air released parking brake assembly of the present invention has the added bonus that it is automatically activated when the car has been removed from the train and the pneumatic braking system used for activating the above discussed truck mounted braking system has been disconnected. Once the car has been reconnected with the train and the pneumatic braking system is again in effect, the spring applied parking brake assembly of the invention is released.

Figure 4:
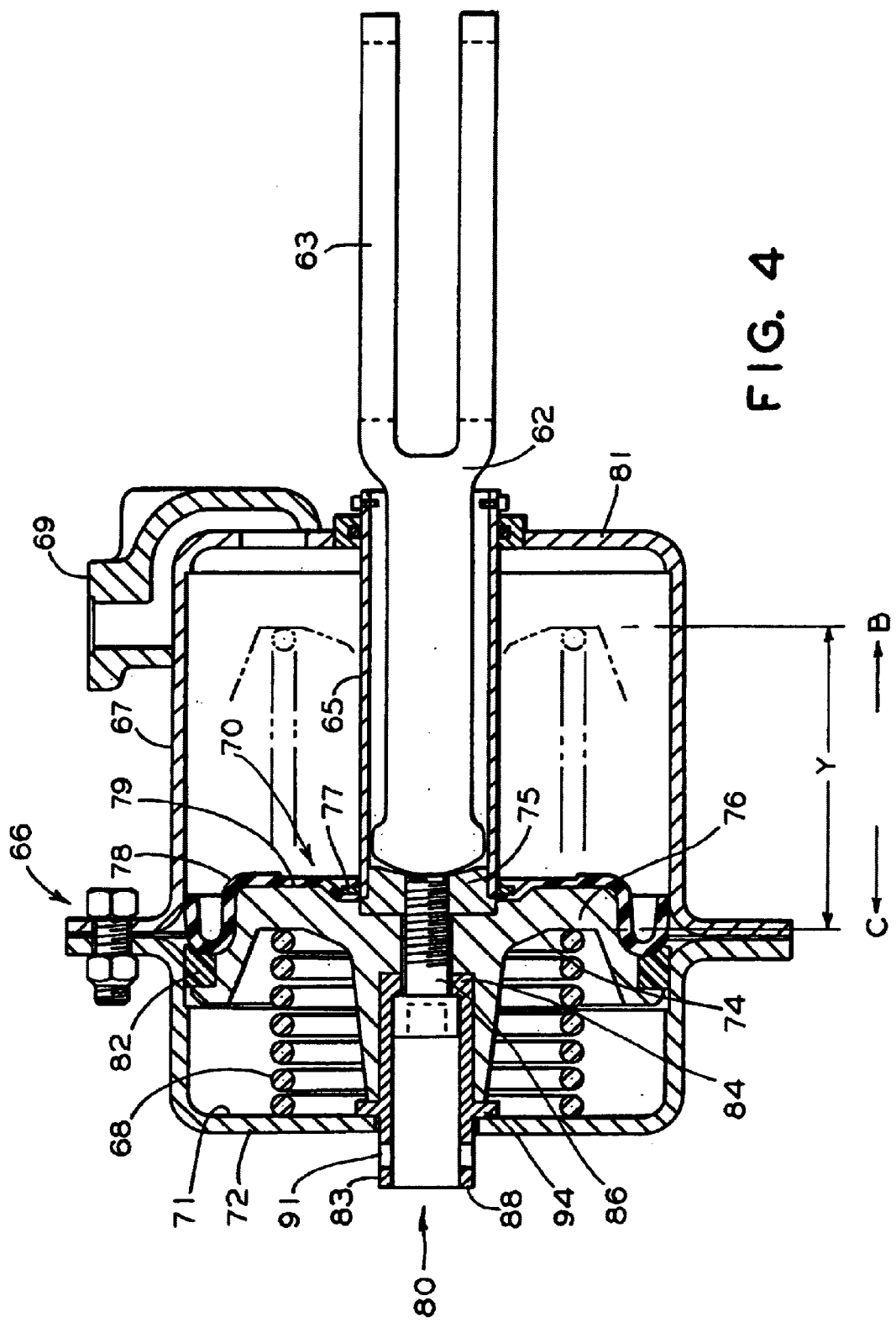
FIG. 4 is a cut away view of the spring applied parking brake assembly of FIG. 1 with the spring member in a compressed position and the piston assembly in a released position.

Referring again to FIG. 1, the spring applied parking brake assembly 60 is preferably mounted alongside the brake cylinder 20. Exemplary mounting locations for the parking brake assembly can be the compression member or the brake beam of the truck mounted braking system, however, any location may be utilized which can sufficiently support the parking brake assembly and ensure that activation of the spring applied brake assembly results in a counterclockwise rotation of the force transfer lever. This mounting can be achieved by means of a bolt/nut arrangement 66, as shown by FIG. 4, for attaching and/or engaging the parking brake assembly with the vehicle braking system. The force transfer lever includes an extension piece 64 and the piston rod 62 of the spring applied brake assembly 60 is attached to this extension piece. This connection is achieved by any well known means such as for example a clamp 63. Activation of the parking brake assembly results in an outward movement of the piston rod 62 which, in turn, causes an outward movement of the extension piece 64 and the counterclockwise rotation of the force transfer lever 14.

FIG. 4 shows a cut away view of the spring applied parking brake assembly 60 of FIG. 1 wherein the spring member is compressed and the piston assembly is in the released position. The parking brake assembly 60 comprises a casing 67 enclosing a piston assembly, generally designated as 70, which is mounted for longitudinal movement within the casing 67. The piston assembly 70 includes a piston 76, a diaphragm 78, and a piston rod 62 secured to a first end 79 of the piston assembly 70. This piston rod is capable of extending through an opening in a first end 81 of the casing. A spring member 68 is disposed within the casing 67 and caged between an inner surface 71 of a second end 72 of the casing 67 and a second end 74 of the piston assembly 70. This spring member 68 is capable of exerting a force against the piston assembly 70 upon a release of the spring member 68 to cause longitudinal movement of the piston assembly 70.

The piston rod 62 is contained within a hollow tube 65 and the hollow tube is associated with the piston 76 via a joining means 75 and is also sealed to the diaphragm 78 with an O-ring 77. The diaphragm 78 and piston 76 are sealed against the inner wall of the casing 67 by means of an O-ring 82. The piston rod 62 includes an attachment means, such as a clamp 63, for attaching the rod 62 to the extension piece 64 of the force transfer lever 14.

Upon removal of the car from the railway vehicle and hence from the pneumatic braking system of the vehicle, longitudinal movement of the piston assembly 70 in a first direction B automatically occurs as the spring member 68 is extended to its natural position. This outward longitudinal movement causes the force transfer lever 14 to rotate in a counterclockwise direction and to apply the brakes to the car. This system enables the parking brake assembly 60 to always be in the activated position when the car has been removed from the train and consequently disconnected from the pneumatic braking system. Since the parking brake assembly 60 of the invention is always in the activated position when the train is disconnected from the pneumatic braking system of the vehicle, unwanted and/or hazardous movement of the parked car due to operator error is avoided.

Once the car has been hooked up to the train and the pneumatic braking system has been connected thereto, the parking brake assembly 60 automatically deactivates. This deactivation is caused by movement of the piston assembly 70 which causes the piston rod 62 attached to the force transfer lever extension piece 64 to move in a second direction C resulting in a compression of the spring member 68 and a release of the brakes. This compression of the spring member 68 is caused by the application of air from the train's pneumatic braking system through an air inlet 69 into the casing which, in turn, applies pressure to the diaphragm/piston 78, 79, causing this diaphragm/piston, which is attached to the piston rod 62, to move a distance Y in a direction C to achieve compression of the spring member 68 and the clockwise rotation of the force transfer lever 14.

Figure 5:
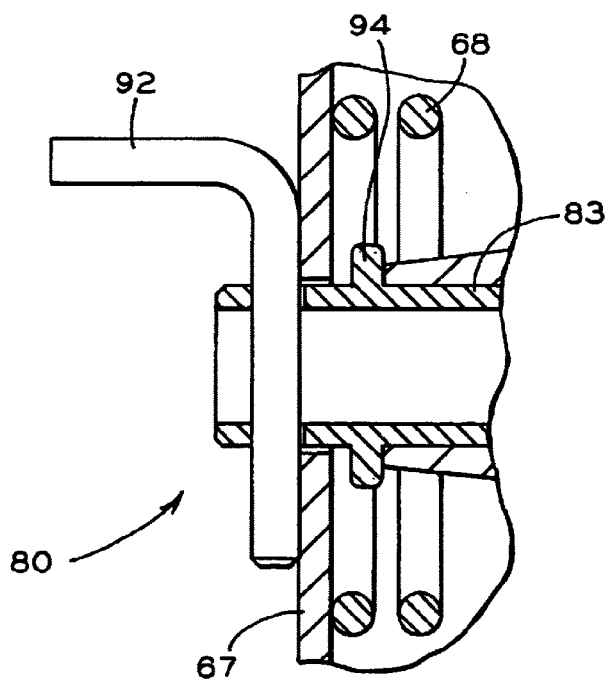
FIG. 5 is partial expanded view illustrating a portion of the installation arrangement, including an exemplary means for holding the spring in a compressed position, for the spring applied parking brake assembly of FIG. 1.

As illustrated in FIGS. 4 and 5, an arrangement or system, generally designated as 80, is also provided in the parking brake assembly 60 to hold the parking brake in the released position during installation of the parking brake assembly 60 into the vehicle braking system. This holding arrangement may also be used if it is desired at any other time to hold the parking brake in the released position after installation onto the car and upon removal of the car from the pneumatic braking system of the railway vehicle. The holding arrangement includes a cylindrical member 82, such as a rod or hollow tube, which is mounted for longitudinal movement within the casing 67. The cylindrical member 83 is associated with the piston assembly 70, such as with a joining means 86, at a first end 84 such that movement of the cylindrical member 83 causes the piston 76, as well as the spring member 68, to move in accordance therewith. An opening is provided within an end surface of the casing 67 and a second end 88 of the cylindrical member 83 extends through this opening. Movement of the cylindrical member 83 in a direction to cause the second end 88 of the cylindrical member 83 to extend through the casing opening causes the piston 76 of the piston assembly 70 to apply a compressive force to the spring member 68. Compression of the spring member 68 results in movement of the piston rod 62 of the piston assembly 70 into a released position. A holding means 92 is then provided to hold this cylindrical member 83 in place so that the spring member 68 is compressed and the piston assembly 70 remains in the released position. Having the parking brake assembly 60, specifically the piston rod 62, in the released position is desirable during the installation of the parking brake assembly 60 into the vehicle braking system. The holding means 92 for the cylindrical member 83 can be in the form of a pin extending through an orifice 91 in the cylindrical member 83, as shown for example in FIG. 5. Also, a stop member 94 may be provided on the cylindrical member 83 to prevent the cylindrical member from being extended too far out of and/or from being completely pulled out of casing 67.

The present invention provides an ergonomic alternative to the currently used hand wheel activated handbrakes of the prior art. Additionally, because the spring applied parking brake assembly of the present invention automatically activates upon removal of the car from the pneumatic braking system of the vehicle, the possibility of unwanted movement of a parked car has been eliminated.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

We claim:

1. A spring applied brake assembly for a railway vehicle braking system, such railway vehicle braking system including a force transfer lever and at least one force transmitting member for initiating a brake application, said spring applied brake assembly comprising:
   (a) a casing engageable with such railway vehicle braking system;
   (b) a piston assembly positioned within and mounted for longitudinal movement within said casing;
   (c) a piston rod secured to a first end of said piston assembly and capable of extending through an opening in a first end of said casing;
   (d) a spring member disposed in said casing and caged between an inner surface of a second end of said casing and a second end of said piston assembly, said spring member being capable of exerting a force against said piston assembly upon a release of said spring member causing longitudinal movement of said piston assembly within said casing causing said piston rod to extend out through said opening in said casing;
   (e) an extension piece attached to said force transfer lever; and
   (f) an attachment means for associating said piston rod with such force transfer lever extension piece such that longitudinal movement of said piston assembly in a first direction causes said piston to extend out from said opening and cause such force transfer lever to rotate and apply a force to such at least one force transmitting member for initiating a brake application.

2. A spring applied brake assembly as recited in claim 1 wherein said casing includes an air inlet for allowing air to be applied within said casing to cause said piston assembly to move in a direction to compress said spring member and deactivate said brake assembly.

3. A spring applied brake assembly as recited in claim 2 wherein piston assembly means includes a piston/diaphragm arrangement and a sealing means is positioned between said casing and said piston/diaphragm arrangement for preventing leakage of air.

4. The valve, according to claim 3, wherein said removable valve seat is provided with a hexagonal recess for receiving one end of an Allen wrench.

5. A spring applied brake assembly as recited in claim 1 wherein said vehicle braking system includes at least one of a brake beam and a compression member and said casing includes an attachment means for mounting said brake assembly to said at leat one of a brake beam and a compression member.

6. A spring applied brake assembly as recited in claim 1 wherein said piston assembly means further includes a piston and a diaphragm.

7. A spring applied brake assembly as recited in claim 6 wherein said sealing means is an O-ring.

8. A spring applied brake assembly as recited in claim 6 wherein a first end of said spring member is positioned adjacent to said inner end surface of said casing and a second end of said spring member is positioned adjacent to said piston of said piston assembly.

9. An arrangement for installing a spring applied brake assembly within a railroad vehicle braking system, said spring applied brake assembly including a casing, a piston assembly disposed within said casing, and a spring member caged between an inner end surface of said casing and an end surface of said piston assembly, said piston assembly being mounted for longitudinal movement within said casing in accordance with extension and compression of said spring member, said arrangement for installing said spring applied brake assembly comprising:
   (a) a cylindrical member mounted for longitudinal movement within said casing, said cylindrical member having a first end and a second end;
      (i) said first end of said cylindrical member extending through an opening in said casing;
      (ii) said second end of said cylindrical member being associated with said piston assembly and said spring member such that longitudinal movement of said cylindrical member in a first direction causes said piston assembly to move in said first direction so as to compress said spring member;
   (b) stop means mounted on sidewalls of said cylindrical member for preventing movement of said cylindrical member greater than a predetermined distance through said opening in said casing; and
   (c) a holding means one of disposed on and attachable with said first end of said cylindrical member for holding said cylindrical member such that said spring member remains compressed during installation of said spring applied brake assembly within said railroad vehicle braking system.

10. A spring applied brake assembly for a railroad vehicle braking system, such railway vehicle braking system including a force transfer lever and at least one force transmitting member for initiating a brake application, said spring applied brake assembly comprising:
   (a) a casing engageable with such railway vehicle braking system;
   (b) a piston assembly positioned within and mounted for longitudinal movement within said casing;
   (c) a piston rod secured to a first end of said piston assembly and capable of extending through an opening in a first end of said casing;
   (d) a spring member disposed in said casing and caged between an inner surface of a second end of said casing and a second end of said piston assembly, said spring member being capable of exerting a force against said piston assembly upon a release of said spring member causing longitudinal movement of said piston assembly within said casing causing said piston rod to extend out through said opening in said casing;
   (e) an extension piece attached to said force transfer lever; and
   (f) an attachment means for associating said piston rod with such force transfer lever extension piece such that longitudinal movement of said piston assembly in a first direction causes said piston to extend out from said opening and cause such force transfer lever to rotate and apply a force to such at least one force transmitting member for initiating a brake application; and
   (g) an arrangement for installing said spring applied brake assembly within said railroad vehicle braking system, said arrangement for installing said spring applied brake assembly including:
      (i) a cylindrical member mounted for longitudinal movement within said casing, said cylindrical member having a first end and a second end, said first end of said cylindrical member extending through an opening in said casing and said second end of said cylindrical member being associated with said piston assembly and said spring member such that longitudinal movement of said cylindrical member in a first direction causes said piston assembly to move in said first direction so as to compress said spring member; and (ii) a holding means one of disposed on and attachable with said first end of said cylindrical member for holding said cylindrical member in place such that said spring member remains compressed during installation of said spring applied brake assembly within said railroad vehicle braking system.

11. A spring applied brake assembly as recited in claim 10 wherein said casing includes an air inlet for allowing air to be applied within said casing to cause said piston assembly to move in a direction to compress said spring member and release said brake assembly.

12. A spring applied brake assembly as recited in claim 10 wherein said piston assembly means includes a piston, a diaphragm, and a piston rod.

13. A spring applied brake assembly as recited in claim 12 wherein a first end of said spring member is positioned adjacent to said inner end surface of said casing and a second end of said spring member is positioned adjacent to said piston of said piston assembly.

14. A spring applied brake assembly as recited in claim 10 wherein said first end of said cylindrical member includes an orifice extending there through and said holding means includes a pin for extending through said orifice of said cylindrical member.

15. A spring applied brake assembly as recited in claim 10 wherein said cylindrical member includes a stop means for preventing movement of said cylindrical member greater than a predetermined distance through said opening in said casing.

* * * * *